Jan. 10, 1967 W. R. POWERS 3,297,802
METHOD AND APPARATUS FOR FORMING A COMPOSITE
HOLLOW CYLINDER OF FOAMED PLASTIC
Filed Sept. 4, 1963 3 Sheets-Sheet 1

INVENTOR.
WILLIAM R. POWERS
BY
ATTORNEY

Jan. 10, 1967 W. R. POWERS 3,297,802
METHOD AND APPARATUS FOR FORMING A COMPOSITE
HOLLOW CYLINDER OF FOAMED PLASTIC
Filed Sept. 4, 1963 3 Sheets-Sheet 2

INVENTOR.
WILLIAM R. POWERS
BY
ATTORNEY

United States Patent Office

3,297,802
Patented Jan. 10, 1967

3,297,802
METHOD AND APPARATUS FOR FORMING A COMPOSITE HOLLOW CYLINDER OF FOAMED PLASTIC
William R. Powers, Penns Grove, N.J., assignor to Scott Paper Company, Philadelphia, Pa., a corporation of Pennsylvania
Filed Sept. 4, 1963, Ser. No. 306,431
5 Claims. (Cl. 264—47)

This invention relates to apparatus and a method for forming tubes and more particularly to the application of such tube forming apparatus and method to the continuous production of cylindrical objects by a centrifugal molding technique.

The production of articles utilizing centrifugal molding, or casting, techniques is a well-known art. In general, however, it can be said that one of the principal limitations of prior techniques has been the restriction of the length of the finished article to the length of the rotatable mold in which the article is shaped. For example, it is known that certain types of pipe can best be cast, or molded, in a mold which is rotated about its axis at high speed to distribute the casting material within the mold under the influence of centrifugal force. Heretofore, in order to produce lengths of pipe by this method it has been necessary to provide a mold which is at least as long as the length of pipe to be cast. Natural limitations on the size of mechanical equipment have made the production of extremely long lengths of pipe uneconomical and the production of continuous lengths of pipe impossible.

Centrifugal molding processes known prior to this invention have been further characterized by exhibiting slow production rates. The "batch" approach of these prior methods, by which each article produced must be allowed to solidify in the mold, the mold opened, the article removed and the mold reclosed before the ingredients for another article can be admitted to the mold, has accounted for the slow production rates.

The present invention has for its principal object the removal of these limitations and drawbacks of prior methods and apparatus for practicing centrifugal molding.

Of the several aspects of this invention which contribute to achievement of this objective the first involves a novel and unique approach to the continuous production of tubing from a flexible material. In accordance with this invention flexible material, preferably in sheet form, is wrapped, or wound, into a unitary tube structure in apparatus and by means of a method which leaves the interior of the tube substantially free and unobstructed, whereby the tube, immediately upon being formed, is receptive to molding material. Moreover, the rotary movement imparted to the tube as it is formed is utilized in centrifuging the molding material deposited therein to hold this material out against the wall of the tube so that the material assumes the configuration of the tube.

The invention further contemplates advancing the finished mold tube away from the zone in which it is formed and past a depositing head, or nozzle, through which molding material is introduced to the tube. As a result, both the tube forming apparatus and the depositing nozzle may assume generally fixed positions while the mold tube and the molded object formed therein are conveyed away on a continuous basis. It, thus, becomes possible to produce centrifugally molded objects of any desired length including, even, objects of infinite length.

One production operation to which this invention has been found to be particularly suited is that involved in the manufacture of cylinders of cellular plastic materials, such as polyurethane plastic foam. These cylinders of cellular material are subsequently peeled to form long lengths of thin sheeting which is used, among other things, for garment inner lining. The ability of the method and apparatus of this invention to produce a uniform parent cylinder of any desired length results in the production of a more uniform plastic sheet having the added advantage of being producible in a variety of widths.

In the production of tubes for use as centrifugal molds in accordance with this invention, there is provided novel apparatus for shaping sheets of flexible material into tubular form. This apparatus comprises a plurality of rollers arranged in a generally cylindrical array so as to provide an open forming cage. Drive means are associated with the rollers which cause at least some of the rollers to rotate about their respective axes for propelling sheet material around the interior of the cage. The rollers forming the cage are mounted in such a manner that their axes can be skewed about the axis of the cage to cause the tube formed therein to advance through an out of the cage. Unlike prior tube forming equipment wherein a mandrel is provided within the forming area about which the tube forming sheet material is wrapped, the apparatus of the present invention need not be provided with a forming mandrel and, hence, the interior of the formed tube is open and unobstructed and capable of receiving the material to be molded immediately after the tube is formed.

Other objects, advantages and features of the invention will be apparent from the following detailed description of a preferred embodiment thereof, in which reference is made to the accompanying drawings, forming a part hereof, and wherein:

FIG. 3 is a perspective view of the tube forming and supporting cage of the apparatus illustrated in FIG. 2;

Figure 1:
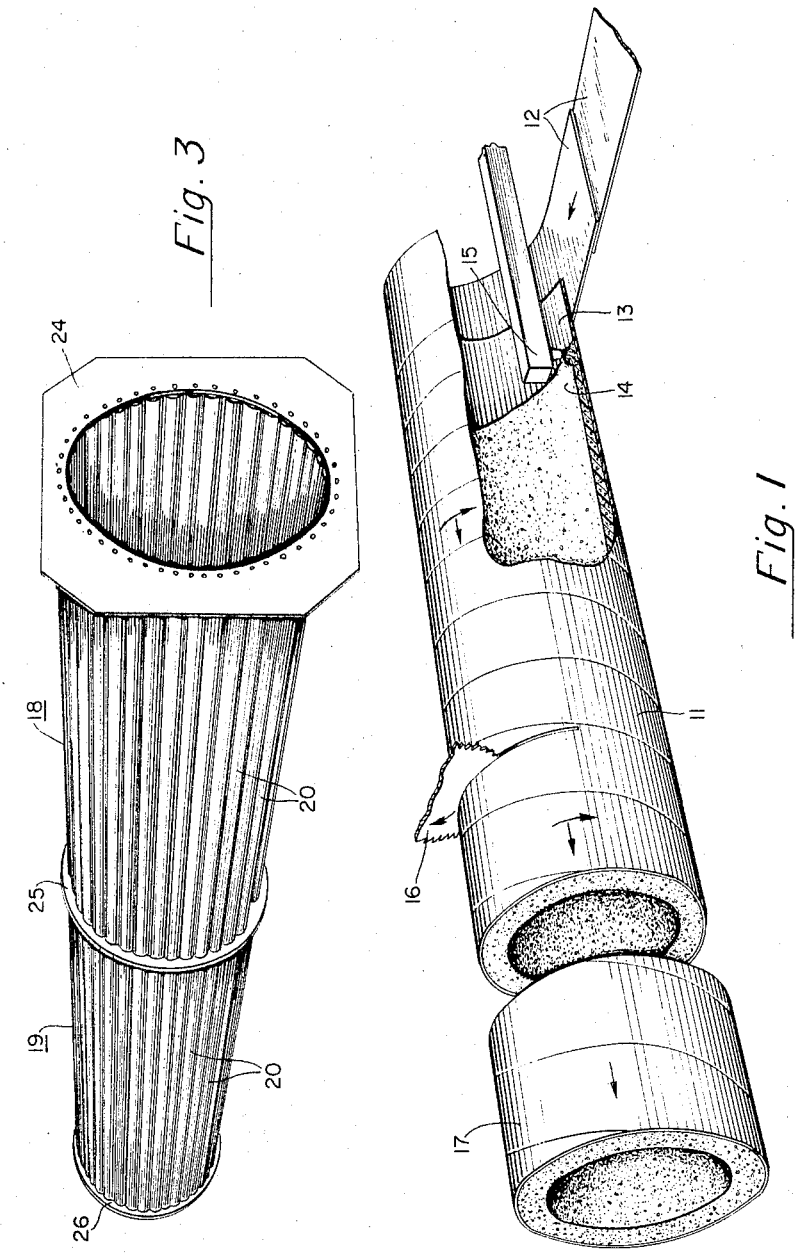
FIG. 1 is a perspective view showing somewhat diagrammatically the tube forming and centrifugal molding method of this invention, and having portions thereof broken away to show the interior of the molding tube.

The novel method of tube formation and the utilization of the formed tube as a centrifugal mold for forming elongated objects are illustrated diagrammatically in FIG. 1, wherein the tube is identified by reference numeral 11. In accordance with this invention tube 11 is made from sheets 12 of flexible material, such as heavy gauge paperboard, which are wrapped in overlapping relationship in a manner to provide an open ended, hollow mold region 13 receptive to a moldable material, indicated at 14. The moldable material 14, or a mixture of ingredients for such material, is conveyed into molding region 13 and deposited on the inner surface of tube 11 by means of a depositing head, or nozzle, 15.

During fabrication of tube 11 there are imparted to the tube two components of motion, one of which is rotation about the axis of the tube and the other of which is axial advancement of the tube, to the left as viewed in FIG. 1. The rotational velocity of tube 11 is sufficient to generate centrifugal force acting on the moldable material 14 to hold this material against the inner surface of the tube and distribute the material evenly in the tube. The rate of feed of moldable material from depositing head 15 is adjusted with reference to the speed of rotation of mold tube 11 and the speed of advancement for the mold tube so as to deposit a uniform layer of predetermined thickness of moldable material over the inside surface of the tube.

The material 14 being molded by the process illustrated in FIG. 1 is a blowable polyurethane which is introduced to the mold as a reactant mixture in viscous liquid form. As the ingredients of this material react, the substance expands to produce a solidified cellular, or more or less reticulated, plastic foam. A speed of rotation of molding tube 11 can be readily selected for the particular mass of the moldable material which will cause the material to be held uniformly out against the inner surface of the tube without interfering with the blowing process so that the resulting molded product has a substantially uniform density from its outer surface to its inner surface.

Molding tube 11 is preferably supported at its exterior and its rotation continued at a uniform velocity throughout a sufficient distance of advance movement to allow the foam material to react sufficiently to become self supporting. Thereafter, advancing portions of tube 11 can move out of the supporting structure and be cut into sections of any desired length by means of a saw 16 or other suitable cutting device. Severed cylinders 17 of molded foam material may have the paperboard tube 11 stripped therefrom to expose the outer surface of the foam for further processing.

Figure 2:
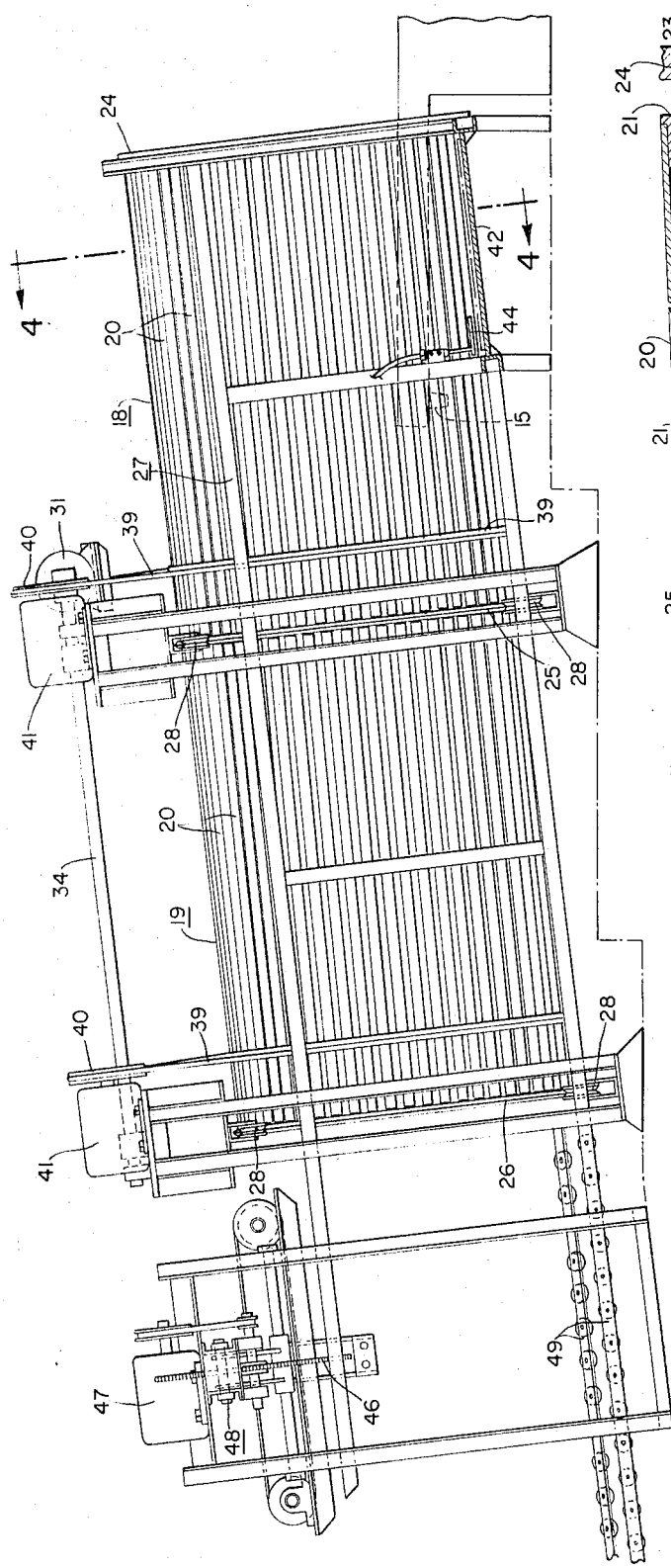
FIG. 2 is a side elevation view of tube forming and centrifugal molding apparatus embodying this invention.

The apparatus used to form flexible sheets 12 into the tube 11 and to support and propel the tube during the molding operation is illustrated in detail in FIGS. 2 through 5. Referring first to FIGS. 2 and 3, the apparatus includes a series of forming cages identified generally by reference numerals 18 and 19. Each cage comprises a plurality of rollers 20 which are arranged in generally cylindrical array. Each roller 20 is supported for rotation about its axis by a suitable arrangement such as that illustrated in FIG. 5 wherein the ends of the roller contain bearings 21 which are carried by a shaft 22. End extensions of each shaft 22 are journaled in universal bearings 23 by which the rollers 20 are attached to supporting structure.

It is essential for the purposes of the present invention that the rollers 20 forming cages 18 and 19 be supported in such a manner as to leave the interior of the cages open and unobstructed and the inner surfaces of the rollers 20 exposed to contact the tube 11 which is formed, rotated and advanced in the cages. The preferred supporting arrangement for cage rollers 20 is best illustrated in FIG. 3 and comprises a series of support rings identified by the numerals 24, 25 and 26, respectively. The first support ring 24, which generally defines the inlet end of the molding apparatus, may be stationarily mounted on a support frame indicated generally at 27 in FIG. 2. Ring 24 is provided with a plurality of holes adjacent the main opening therein for the purpose of receiving the universal bearings 23 for one end of each of the rollers 20 forming the first cage 18.

Figure 5:
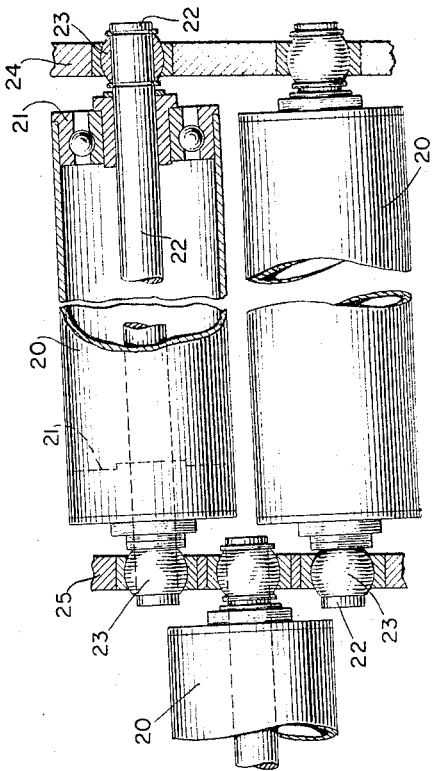
FIG. 5 is a fragmentary sectional view through the forming cage portion of the apparatus in FIG. 2, taken generally as indicated by the line 5—5 in FIG. 4.

Support ring 25 serves both cages 18 and 19 and for this purpose has two sets of holes provided about its opening for the purpose of supporting the other end of each of the rollers 20 in the first cage 18 and one end of each of the rollers in the second cage 19 (see FIG. 5). The other end of each of the rollers 20 in the second cage 19 are supported by support ring 26 which is at the exit end of the cage structure.

Figure 4:
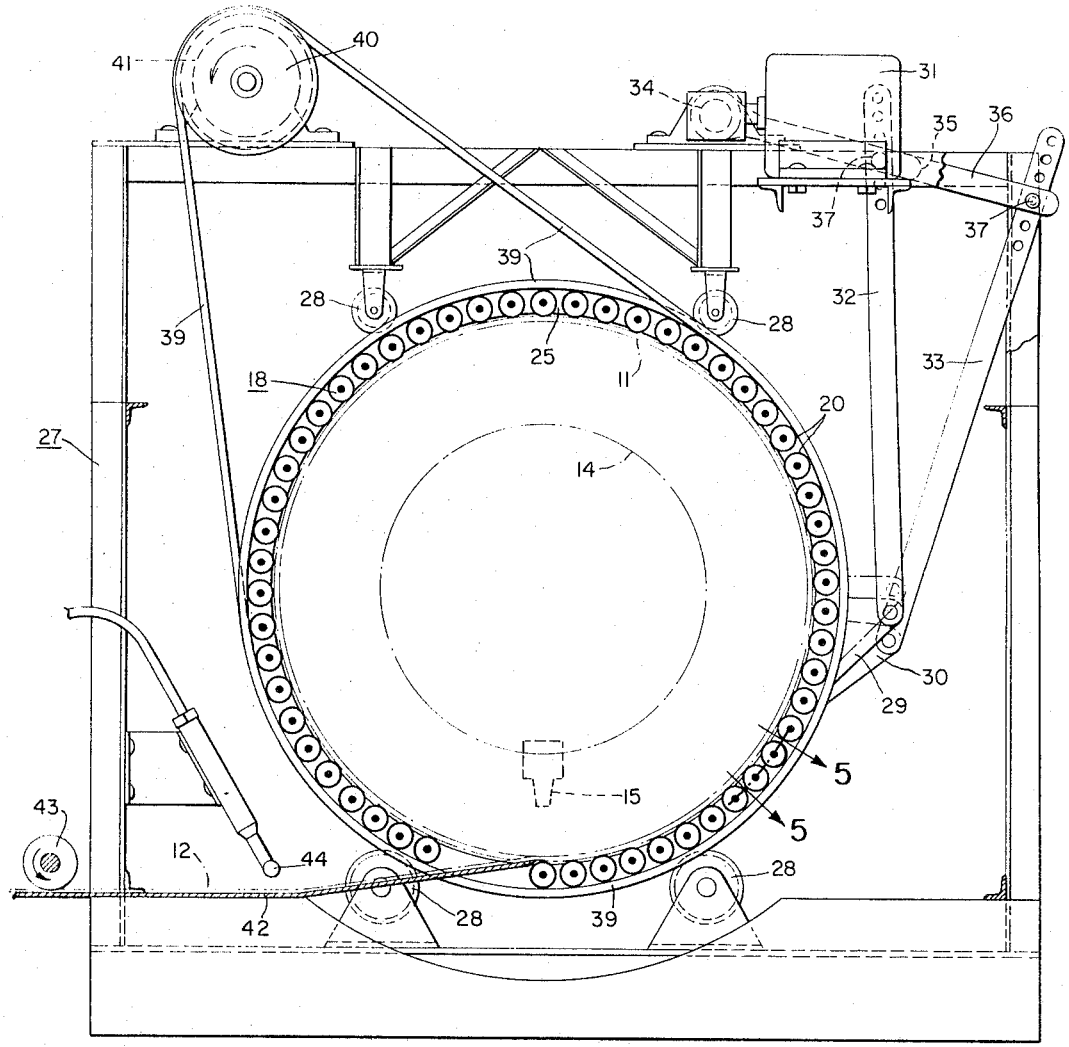
FIG. 4 is a sectional view of the apparatus shown in FIG. 2, taken generally as indicated by line 4—4 in FIG. 2.

Support rings 25 and 26 are carried in frame 27 in such a manner that the rings can undergo limited rotary movement about the axis of cages 18 and 19 with respect to the stationary support ring 24 and with respect to each other. For this purpose the frame 27 is equipped with freely rotatable guide wheels 28 arranged in pairs at the lower and upper peripheral regions of support rings 25 and 26. As shown in FIGS. 2 and 4, support rings 25 and 26 may be provided with beveled edges which are received in mating V-grooves in the periphery of guide wheels 28 for precision alignment of the support rings.

Support rings 25 and 26 are mounted for limited rotary movement for the purpose of permitting the opposite ends of the rollers 20 in each of the two cages 18 and 19 to be shifted with respect to each other to skew each of the rollers about the axis of the cages. The universal bearings 23 at each end of the shafts carrying the rollers 20 permit the support rings 24, 25 and 26 to remain parallel and in planes perpendicular to the axis of cages 18 and 19 regardless of the degree of skewing of rollers 20. As will be explained in greater detail hereinafter, this skewing of rollers 20 is for the purpose of imparting an axial component of motion to the tube 11 which is formed in cage 18.

The means for rotatively adjusting support rings 25 and 26 is best illustrated in FIG. 4 and includes ear-like projections 29 and 30 which are carried, respectively, by rings 25 and 26 and to which are pivotally attached push rods 32 and 33 respectively. The push rods 32 and 33 are actuated from a rotatable drive shaft 34 through arms 35 and 36 which are pivotally attached to push rods 32 and 33, respectively, by means of detachable pins 37. Push rods 32 and 33 are preferably provided with a series of openings for receiving the pins 37 to permit of initial adjustment of rings 25 and 26 with respect to each other.

It can be readily appreciated that rotation of shaft 34, which may be accomplished manually or with the assistance of a motorized drive, indicated at 31, effects simultaneous angular movement of supporting rings 24 and 25. In order to impart the same amount of skew to rollers 20 in the second cage 19 as is imparted to rollers 20 in the first cage 18 it is necessary to move supporting ring 26 through a larger arc of movement than ring 25 is rotated. This is provided for in the adjusting means illustrated in FIG. 4 by making arm 36 of one linkage longer than arm 35 of the other linkage. Thus, for any given degree of rotary movement of adjusting shaft 34, arm 36 will impart a greater degree of movement to push rod 33 and ring 26 than arm 35 imparts to push rod 32 and ring 25.

It is to be understood that adjustment of the degree of skew imparted to the rollers 20 of cages 18 and 19 is made principally for the purpose of altering the rate of advance of tube 11 through the apparatus. As such, this adjustment provides a means for controlling the length of time that the moldable material 14 is retained within the supporting framework of cages 18 and 19 to insure that support is not withdrawn from the relatively flexible molding tube 11 until the moldable material has become self supporting. In the case of the production of foamed polyurethane plastic cylinders, a reaction time period of three or four minutes is generally sufficient to permit the cellular mass to set and acquire enough strength to permit handling. With material of this nature several hours may be required for the ingredients to react fully, but completion of the reaction can take place after the formed cylinders have been removed from cage 19.

Ordinarily, adjustment of the degree of skew of rollers 20 is not required during a molding run, but only when shifting from one type of moldable material to another. Thus, the position of support rings 25 and 26 will usually be ascertained and set only at the beginning of each molding run.

Movement of the flexible sheets 12 about the interior of forming cage 18 and movement of tube 11 formed therefrom is preferably effected by driving at least some, and preferably all, of the rollers 20 making up cage 18. The preferred arrangement for driving rollers 20 is illustrated in FIGS. 2 and 4 and includes a flexible belt 39 which is wrapped several times about cage 18 in frictional engagement with rollers 20 and is also trained about a pulley 40 which is connected to a motor drive 41. The arrows in FIG. 4 indicate the direction of movement of the various components of the drive in producing counterclockwise rotation of the molding tube 11. Belt 39 is driven in such a manner that it moves clockwise about the array of rollers 20, imparting a clockwise rotary movement to each of the rollers which it contacts. Flexible sheets 12 and tube 11 formed therefrom, contact the inwardly presented surface areas of the rollers 20 and the combined driving effect of the rollers is such as to cause the sheets 12 and the formed tube 11 to move counterclockwise about the interior of forming cage 18.

The rollers 20 of the second cage 19 are driven by a similar drive arrangement comprising another belt 39, pulley 40 and motor drive 41 as shown in FIG. 2. Inasmuch as second cage 19 functions primarily to support molding tube 11 as the moldable material sets up therein and to continue rotation of tube 11 at the same speed of rotation at which it was formed, cages 18 and 19 could be driven from a single source of motive power. However, the independent drive systems illustrated permit the use of smaller and less expensive drive motors.

Flexible sheets are fed to the interior of the cage 18 along a feed tray 42 which may have a driven friction wheel 43 associated therewith for propelling the sheets along the tray. As shown in FIG. 4, one or more locations for rollers 20 near the bottom of cage 18 may be left vacant to permit tray 42 to extend into the array of rollers for the purpose of guiding sheets 12 into contact with the inwardly presented surface areas of the rollers 20. A more stable tube 11 is produced if the apparatus includes means for applying adhesive to regions of the sheets 12 which overlap in the finished tube. In the apparatus shown, adhesive in the form of a rapidly setting glue is applied by a shower head 44 which is disposed above an edge region of tray 42 in position to have an edge strip of each sheet 12 pass therebeneath immediately prior to the sheet entering forming cage 18.

As has been suggested previously, rollers 20 of cages 18 and 19 are driven at a speed which is sufficient to propel sheets 12, tube 11 and the moldable material 14 about the interior of the cages with a velocity sufficient to generate centrifugal force for holding these items and this material out against the interior of the cages. The exact speed required for this purpose is dependent upon the diameter of cages 18 and 19, larger diameters requiring higher speeds. It is preferred that the rotational velocity of the moldable material 11 be maintained at a level just sufficient to produce the required centrifugal force and that very high velocities be avoided inasmuch as the latter may impose forces on the material 14 which would impede, or at least influence, the blowing reaction of the plastic material. In the molding of cylindrical objects of blown polyurethane material in paperboard molding tubes 4 feet in diameter it has been ascertained that a speed of rotation of 70 r.p.m. is sufficient to enable the apparatus to satisfactorily perform its intended function.

The centrifugal molding apparatus of this invention may, if desired, be equipped with means for cutting the molded objects formed therein into preselected lengths as the tube 11 emerges from cage 19. Apparatus for this purpose is illustrated in FIG. 2 and includes a circular saw 46 which is equipped with a drive motor 47 and mounted on a traveling support 48 which permits the saw blade to be raised and lowered and simultaneously moved in a direction parallel to its axis of rotation. Traveling saw mounts of this type are well known and need not be described in detail. With such a saw mounting arrangement it is possible to sever sections of molding tube 11 and the material molded therein while the tube 11 is rotating and moving axially out of cage 19. While being cut the tube 11 is preferably supported from beneath by several roller tracks indicated generally at 49.

From the foregoing it should be apparent that this invention provides a novel approach to tube forming and centrifugal molding techniques in which novel apparatus is employed to form large diameter tubing from flexible sheet material without the aid of a mandrel which would interfere with the immediate utilization of the formed tube as a centrifugal mold. Unique, also, to this invention is the concept of wrapping sheet material into a tube and utilizing the rotary movement inherent in the tube forming operation as a means of imparting centrifugal force to a moldable material to cause it to assume the configuration of the tube.

While the invention has been described with reference to but a single embodiment of the apparatus aspects thereof and particularly with reference to the production of cylindrical objects made from foamed polyurethane plastic, it is to be understood that it is not so limited and is susceptible of having various changes and modifications made to the apparatus and method described without departing from the scope and spirit of the invention.

What is claimed is:

1. A method of forming tubing which comprises introducing sheets of flexible tube forming material into a forming cage having a substantially unobstructed central region, rotating the sheets about the interior of the forming cage at a velocity sufficient to generate centrifugal force for holding said sheets against the interior of the cage, and simultaneously advancing the tube thus formed through and out of said cage.

2. A method of forming a hollow cylinder of foamed plastic material comprising the steps of forming sheets of flexible material into a rotating and axially advancing tube, depositing the ingredients of a foamable plastic material onto the inner surface of said tube while supporting the tube exteriorly to leave the interior thereof substantially free of obstruction, rotating said tube at a velocity sufficient to generate centrifugal force to maintain said ingredients distributed substantially uniformly over the inner surface of the tube, and continuing the rotation and advancement of said tube until said ingredients have undergone their foaming process so as to partially fill the interior of the tube and render the foamed plastic material self supporting.

3. A method as set forth in claim 2 further characterized by thereafter cutting said tube and the foamed plastic material therein into selected lengths.

4. Tube forming apparatus comprising first and second forming cages each comprising a plurality of rollers disposed in cylindrical array, said cages being disposed in adjacent, uni-axial relationship, a stationary support ring for one end of each of the rollers in one of said cages, a first movable support ring for the other end of each of the rollers in said first cage and one end of each of the rollers in the second cage, a second movable support ring for the other end of each of the rollers in the second cage, and means for imparting to said first and second movable support rings limited rotative movement about the axis of said cages.

5. Apparatus as set forth in claim 4 in which said second support ring is rotatedly offset from said first support ring and the said means for moving said first and second support rings effects simultaneous movement of the two said support rings.

References Cited by the Examiner

UNITED STATES PATENTS 991,175   4/1911   Shirley _____ 72—145 XR (Other references on following page)

UNITED STATES PATENTS

| | | | |
|---|---|---|---|
| 2,037,043 | 4/1936 | Postlewaite | 25—38 XR |
| 2,307,817 | 1/1943 | Austin. | |
| 2,309,903 | 2/1943 | Hume | 25—38 XR |
| 2,484,018 | 10/1949 | Crom | 264—270 |
| 3,007,203 | 11/1961 | Ammons | 264—54 XR |
| 3,052,927 | 9/1962 | Hoppe et at. | 264—46 |
| 3,118,800 | 1/1964 | Snelling | 264—47 XR |
| 3,210,980 | 10/1965 | Sengel | 228—15 XR |

FOREIGN PATENTS

| | | |
|---|---|---|
| 831,314 | 2/1952 | Germany. |

References Cited by the Applicant

FOREIGN PATENTS

| | | |
|---|---|---|
| 287,592 | 1928 | Great Britain. |
| 864,592 | 1961 | Great Britain. |

ALEXANDER H. BRODMERKEL, *Primary Examiner.*
P. E. ANDERSON, *Assistant Examiner.*